United States Patent [19]

Fluga et al.

[11] Patent Number: 5,101,556

[45] Date of Patent: Apr. 7, 1992

[54] METHOD OF MANUFACTURING A PISTON

[75] Inventors: Gerry E. Fluga; Brian P. Couch, both of South Bend, Ind.

[73] Assignee: Allied-Signal Inc., Morristown, N.J.

[21] Appl. No.: 628,966

[22] Filed: Dec. 17, 1990

[51] Int. Cl.$^5$ ............... B23P 15/10; B29C 67/12
[52] U.S. Cl. ............... 29/888.046; 29/888.04; 87/1; 87/7; 87/9; 92/248; 264/103; 264/258; 156/149; 156/173
[58] Field of Search ............... 29/888.046, 888.042, 29/888.047, 888.048, 888.04; 156/148, 149, 393, 441, 79, 172, 173; 87/1, 7, 8, 9, 11, 23, 34, 35; 92/212, 248; 264/103, 258

[56] References Cited

U.S. PATENT DOCUMENTS

| | | | |
|---|---|---|---|
| 4,450,610 | 5/1984 | Schäper | 29/888.046 |
| 4,983,240 | 1/1991 | Orkin et al. | 156/148 |

Primary Examiner—Timothy V. Eley
Attorney, Agent, or Firm—Leo H. McCormick, Jr.; Larry J. Palguta; Robert A. Walsh

[57] ABSTRACT

A method of manufacturing a piston for transferring an output force to a member in responsive to pressurized fluid being communicated to a bore in a housing. The piston has a cylinder body made of a plurality of triaxial braided layers of carbon fibers which are placed on a mandrel with spacers located between the layers to form an annular projection of a first end and a taper of a second end. The carbon fibers are inpregnated with a thermoset resin and cured to define a unitary solid structure. Thereafter a cone and collar, throughwhich an output force is suppled to member, is attached to the second en dand the unitary structure inserted in the bore.

7 Claims, 1 Drawing Sheet

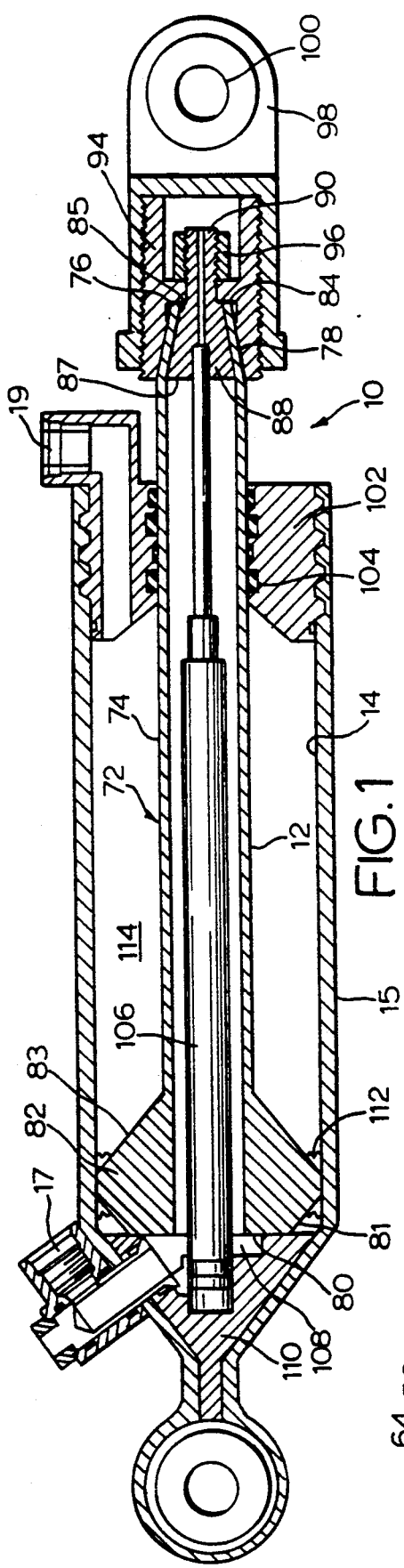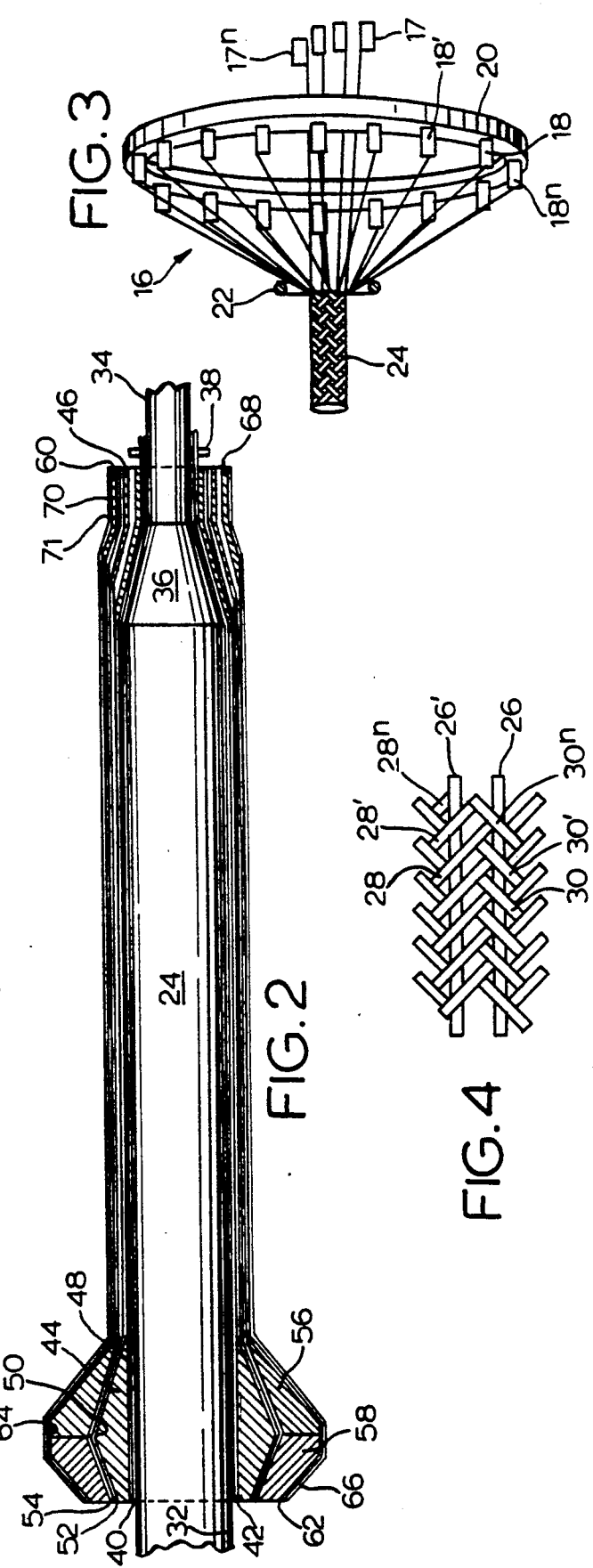

METHOD OF MANUFACTURING A PISTON

METHOD OF MANUFACTURING A PISTON

This invention relates to a method of manufacturing a piston through which an output force is supplied to a member in response to pressurized fluid supplied to a bore in an actuator of an aircraft hydraulic system. The piston has a cylindrical body made by triaxially braided continuous carbon fiber layers over a mandrel and spacers which are inpregnated with a thermoset resin. Curing the resin results in a unitary solid structure capable of transmitting the output force to the member.

In the development of new aircraft, it is desirable to reduce the total overall weight of the aircraft through the reduction in weight of various component parts to improve payload and fuel efficiency. Heretofor, certain advances in the development of materials has resulted in the use of lightweight composite materials in the manufacture of at least non-structural components. As an example, the substitution of carbon brakes for steel brakes has resulted in a 30-40% weight reduction in the brakes systems in many aircrafts. In addition, a molded phenolic piston have been suggested for use to pressurized fluid for actuating a brake system. While molded resin pistons may be adequate to meet the requirement of a brake system where the stroke of the piston is limited, when the stroke is extended, lateral forces could place a strain on the connection between a connecting rod and the piston which may result in a structural failure.

The present invention discloses a method of manufacturing an integral piston and rod assembly wherein a thermoset resin body is continuously reinforced by a plurality of plys of triaxially braided carbon fibers to provide lateral and axial strength sufficient to transmit an output force from an actuator to a member in response to pressurized fluid supplied to a bore to meet an operational requirement in an actuation system.

In this method of manufacturing a lightweight piston with an integral output rod, a first layer of carbon fibers is triaxially braided on a mandrel having a cylindrical body with a first diameter on a first end and a second diameter on a second end. The cylindrical body has a taper that transitions the first diameter into the second diameter. Thereafter, a first and second spacers are located on the first ply adjacent the first and second ends, respectively. A second layer of carbon fibers is triaxially braided over the first layer and first and second spacers. Thereafter, third and fourth spacers are located on the second layer over the first and second spacers, respectively. A third layer of carbon fibers is triaxially braided over the second layer and third and fourth spacers. The mandrel with the first, second and third layers of carbon fibers are removed from the braiding machine and transported to a chamber where a thermoset resin completely inpregnates the carbon fibers. Thereafter, the resin is cured on the mandrel to define a unitary solid structure. The solid structure when removed from the cylindrical body has a peripheral surface with a first diameter separated from a second diameter by a taper. The end of the cylindrical body has an annular projection formed by the first and third spacers that extends from the first diameter while the taper which is formed by the second and fourth spacers is located adjacent the second end. After attaching a fitting to the second end of the cylindrical body, a seal is placed on the annular projection and the structure is inserted into the bore of a housing. The annular projection and seal engage the bore and when pressurized fluid is supplied to the bore, an output force develops which is communicated through the cylindrical body to the fitting for moving a member according to an operational requirement.

It is an object of this invention to provide a method of manufacturing a piston for use in an actuator, the piston having a cylindrical body which is reinforced by a plurality of triaxially braided carbon fibers retained in a thermoset resin matrix.

An advantage of this method of manufacturing a piston according to the principals disclosed herein reside in the continuous reinforcement of the cylindrical body in the axial and radial planes through the use of triaxially braided carbon fibers held in a thermoset resin matrix.

It is a further object of this invention to provide an actuator with a lightweight hydraulic piston responsive to pressurized fluid in a bore to provide an input force for moving a member.

These objects and advantages should be apparent from reading this specification and viewing the drawing wherein :

FIG. 1 is a sectional view of an actuator having a piston manufactured according to the method of this invention disclosed herein;

FIG. 2 is a sectional view of a mandrel on which the carbon fibers in the piston of FIG. 1 are triaxially braided to reinforce the cylindrical body, head and attachment of the piston;

FIG. 3 is a schematic illustration of a braiding mechanism for placing the carbon fibers on the mandrel; and FIG. 4 is an illustration of the triaxial braid of the carbon fibers which provide the axial and lateral reinforcement for the piston of FIG. 1.

The actuator 10 shown in FIG. 1 has a piston 12 located in a bore 14 of a housing 16 for supplying a member with a force to meet an operation demand in response to pressurized fluid being supplied to the bore 14. The lightweight piston 12 is made of a plurality of triaxially braided carbon fibers layers held in a phenolic cyanate resin matrix.

The carbon fibers which are purchased from Amoco Performance Products have a nominal tensile strength of 730,000 psi are braided in a machine 16 of the type illustrated in FIG. 3. In the braiding machine 16 is essentially made up of a plurality of movable carriers 18, $18' \ldots 18^n$ located on a track plate 20, stationary carriers 17, $17' \ldots 17^n$, a former or guide ring 22 and mandrel 24. The track plate 20 supports the carriers 18, $18' \ldots 18^n$ which move along a path controlled by horngears in a Maypole fashion. The carriers 17, $17' \ldots 17^n$ and 18, $18' \ldots 8^n$, which hold the carbon fiber, control the tension of the carbon fiber onto the mandrel 24. Braid forms at a predetermined rate based on the speed of the movement of the mandrel 24 away from the point of braiding, the number of carriers 18, $18' \ldots 18^n$, the orientation of the carbon fiber and the width of the braid. The basic braided fabric consists of a tubular cloth formed by intertwined, carbon fibers having a triaxial braid as illustrated in FIG. 4 wherein strands 26 from stationary carrier 17, $17' \ldots 17^n$ are axially aligned with 0° orientation while strands 28 and 30 from carriers 18, $18' \ldots 18^n$ have from 30°-40° (nominally 35°) of orientation down the mandrel 24. The angles of strands 28 and 30 are identical but have opposite signs at any point along the braid. Strands 28 and 30 are intertwined, but do not intersect with each other, and cylindrically parallel to each other but cylindrically orthogonal from each other. To interlace the strands 28 and 30 one half of the carriers 18,18''... 18n−1 are moved in a clockwise motion toward the center of the track 20 while and the other half of the carriers 18', 18'''... $18^n$ are moved in a counterclockwise motion away from the center of the track 20. At the same time the carbon fibers are moving in and out in a radial direction, they are also moving along the circumference of the mandrel 24.

The mandrel 24 as best shown in FIG. 2 has a cylindrical body with a first diameter 32 that transitions into a second diameter 34 by taper 36. The taper 36 is approximately at a 15° angle from the first and second diameters 32 and 34. The first and second diameters 32 and 34 being selected in accordance with the desired load required to be supplied by the actuator 10. In the instant application, the first diameter is 0.839 inches and the second diameter is 0.375 inches.

After mandrel 24 is sprayed with a release agent, to prevent the thermoset resin from sticking to the mandrel 24, the mandrel 24 is placed in a fixture in axial alignment with the braiding machine 16. The end of the strands of the carbon fibers 26, 28 and 30 are held by a clamp 38 on the second diameter 34 of mandrel 24 and the mandrel 24 moved in an axial direction away from the braiding machine 16 as the carrier 18, 18'... $18^n$ are moved around the mandrel 24 to produce a first ply 40 of triaxial braided carbon fabric. The shape of the first ply 40 is substantially identical to the contour of the mandrel 24. When the triaxially braided carbon fabric reaches a preset length on the first diameter 32, a clamp (not shown) is placed around the braid, the plurality of strands 26, 28 and 30 are cut and the mandrel 24 moved toward the braiding machine 16 to repeat the braiding operation by braiding a second plier 42 of the top of the first ply 40 to produce a first layer of carbon fiber fabric. After laying down the second ply 42 and retaining the same with clamp 38, a first preformed spacer 44 is located over the first layer on the first diameter 32 while a second preformed spacer 46 is placed on the second diameter 34. In order to provide continuity for the resulting piston 12, spacer 44 is made from monolithic carbon and spacer 46 is made from carbon fiber although other spacer materials could also be used such as aluminum. The first spacer 44 has a cylindrical base 48 with an interior diameter substantially identical to the peripheral surface of the second ply 42 and an apex 50 that extends from the base to a point approximately one half the distance to the desired diameter of piston 12. The second spacer 46 which is a braided carbon fibers at ±80°, has a cylindrical and taper shape substantially concentric to the second diameter 34 and taper 36 of mandrel 24.

After spacers 44 and 46 are placed on the first layer, mandrel 24 is again aligned with braiding machine 16 and the end of the strands of the carbon fibers 26, 28 and 30 are held by a clamp 38 on the second diameter 34 of mandrel 24. Thereafter, mandrel 24 is moved in an axial direction away from the braiding machine 16 as the carrier 18, 18'... $18^n$ are moved around the mandrel 24 to produce a third ply 52 of triaxial braided carbon fabric over the second ply 42 and first and second spacers 44 and 46. When the braided carbon fabric reaches a predetermined distance on the second diameter 34, the strands 26, 28 and 30 are cut and this triaxial brading step repeated to create a fourth ply 54 on this third ply 52 to produce a second layer of carbon fiber fabric. After the fourth ply 54 is triaxially braided on the third ply 52, strands 26, 28 and 30 are cut and one half 56 of a third spacer is placed on the second layer and moved into engagement with the other half 58 of the the third spacer in a position over the first spacer 44. A fourth spacer 60 is placed on the fourth layer 54. As with the first and second spacers 44 and 46, the third 56, 58 and fourth spacer 60 are made from monolithic carbon and carbon fibers, respectively. The third spacer 56, 58 has a base that matches the apex 50 and sides of the first spacer 44 and an exterior surface with side angles of approximately 40° that terminate at a flat top 64. The fourth spacer 60 which is braided carbon fibers with a surface concentric to the second spacer 46 and taper 36 and second diameter 34 on mandrel 24.

After third and fourth spacers are placed on the second layer, mandrel 24 is again aligned with braiding machine 16 and the end of the strands of the carbon fibers 26, 28 and 30 are held by a clamp 38 on the second diameter 34 of mandrel 24. Thereafter, mandrel 24 is moved in an axial direction away from the braiding machine 16 as the carrier 18, 18'... $18^n$ are moved around the mandrel 24 to produce a fifth ply 62 of triaxial braided carbon fabric over the second layer 54 and third and fourth spacers 56, 58 and 60. When the braided carbon fabric reaches a predetermined distance on the first diameter 32, the strands 26, 28 and 30 are cut and this triaxial braiding step repeated to create a sixth ply 66 on the fifth ply 62 to produce a third layer of carbon fiber fabric.

Initial stress calculations indicated additional reinforcement would be required to transmit the force created across the annular projection on the first diameter into the reduced second diameter section of piston 12. Therefore, a fifth spacer 68 is placed over the fourth spacer 60 and strands of the carbon fibers 26, 28 and 30 are held by a clamp 38 on the second diameter 34 of mandrel 24. Thereafter, mandrel 34 is moved in an axial direction away from the braiding machine 16 as the carrier 18, 18'... $18^n$ are moved around the mandrel 24 to produce a seventh ply 70 of triaxial braided carbon fabric over the third layer and fifth spacers 68. When the braided carbon fabric reaches a predetermined distance on the second diameter 34, the strands 26, 28 and 30 are cut and this triaxial braiding step repeated to create a eight ply 71 on the seventh ply 62 to produce a fourth layer of carbon fiber fabric. The mandrel 24 with the triaxial braided carbon fibers located thereon is removed from the fixture and transported to a mold or chamber where a thermoset resin such as phenolic cyanate resin used herein and disclosed in U.S. Pat. No. 4,831,086 inpregnates the carbon fibers. Thereafter, the phenolic cyanate resin is cured in the mold or chamber having a temperature of approximately 290° F. for about 1.5 hours to produce a solid unitary structure. The solid structure or piston 12 as best shown in FIG. 1 when removed from the mandrel 24 has a cylindrical body 72 with a peripheral surface with a first diameter 74 separated from a second diameter 76 by a taper 78. The ends 80 and 84 of the cylindrical body 72 is machined to produce a flat surfaces. Annular projection 82 formed by the first and third spacers extends from the first diameter 34 adjacent end 80 while the taper 78 which is formed by the second and fourth spacers is located adjacent the second end 84.

An actuator closure member 102 having a plurality of seals 104 is placed on the first diameter 74 of the cylindrical body and a cone 88 inserted into the interior bore 73. Cone 88 has a peripheral surface that is concentric to the taper 36 and second diameter 34 of the mandrel 24 and a threaded shaft 90 that extends through opening 85 on end 84 of the cylindrical body 72. A collar 94 which is placed the second end 84 surrounds the second diameter surface 76 and tapered surface 78 although it is anticipated that for some applications that the collar 94 would not need to surround the tapered surface 78. A nut 96 is screwed onto threads on shaft 90 to hold the tapered section and second diameter section of the cylindrical body 72 between the cone 88 and collar 94. Thereafter an end cap 98 having an eyelet 100 is screwed onto collar 94 to provide a mechanical connection of the second end 84 to a member to which an output force is to be applied. An expandable position sensor 106 attached to cone 88 and connector 110 is located in chamber 108 formed by housing 16 and piston 12.

A shrink fit or expandable seal 112 is placed on the annular projection 82 and piston 12 placed in bore 14. Seal 112 essentially seals chamber 108 from chamber 114. Thereafter, closure member 102 is screwed into housing 16 to complete the manufacture of the actuator 10.

Actuator 10 is of the type wherein pressurized fluid is communicated through either port 17 or 19 in housing 16. When pressurized fluid is presented to chamber 108, the pressurized fluid acts on end 80 and face 81 of annular projection 82 of piston 12 and surface 87 of cone 88 to provide an output force that is communicated through eyelet 100 to a member. As annular projection 82 moves in bore 14 toward closure member 102, fluid in chamber 114 is returned to a storage chamber associated with the source of pressurized fluid. Similarly, when it is desired to move the piston 12 away from closure member 102, pressurized fluid is communicated through port 19 and acts on face 83 of the annular projection 82 to create a force that moves piston 12 toward port 17.

In evaluating the structural integrity of piston 12, loads were applied to test the strength of annular projection 82 and the reduced area of the taper 78, cylindrical body 72 and second diameter 76. A force of 28,600 pounds was required to fail the triaxially braided carbon fiber reinforced phenolic cyanate resin piston 12 in compression while a force of 18,300 pounds created a failure in tension. Piston 12, according to this test, is the equivalent of a similar lightweight metal piston and connection rod members used in current actuators but weighs about two thirds as much and should be competitive in price.

We claim:

1. A method of manufacturing a piston responsive to pressurized fluid supplied to a bore of a cylinder to develop an output force corresponding to the pressurized fluid comprising the steps of:

triaxially braiding a first layer of carbon fibers on a mandrel having a cylindrical body with a first end and a second end, said cylindrical body having a first section that extends from said first end to a tapered section connected to a second section that extends from said second end, said first section having a first diameter and said second section having a second diameter;

locating a first spacer on said first layer over said first section and adjacent said first end;

locating a second spacer on said first layer over said second section and adjacent said second end;

triaxially braiding a second layer of carbon fibers over said first layer and said first and second spacers;

locating a third spacer on said second layer over said first spacer;

locating a fourth spacer on said second layer over said second spacer;

triaxially braiding a third layer of carbon fibers over said second layer and said third and fourth spacers;

inpregnating said first, second and third layers of carbon fibers with a thermoset resin;

curing said resin to define a unitary solid structure;

removing said structure from said mandrel, said structure having a cylindrical body with a first end and a second end, said cylindrical body surface having a first diameter separated from a second diameter by a taper and an annular projection formed adjacent said first end by said first and third spacers, said taper being formed by said second and fourth spacers located adjacent said second end;

attaching a fitting to said second end of said structure; and inserting said structure in said bore, said annular projection engaging said bore and responding to a force developed across the first end by pressurized fluid supplied to said bore to transmit an output force to another member through said fitting.

2. The method as recited in claim 1 further includes the step of:

placing a seal on said annular projection before inserting the unitary structure into said bore to prevent fluid from flowing around said first diameter when pressurized fluid is supplied to said bore to move the cylindrical body within the bore.

3. The method as recited in claim 2 wherein attaching said fitting includes the steps of:

inserting a cone in said unitary structure, said cone having a shaft which extends through said unitary structure at said second end;

placing a collar on said second end, said collar engaging said second diameter for transmitting an output force from the piston; and attaching a fastener to said shaft for holding said cone and collar on said cylindrical body.

4. The method as recited in claim 3 wherein said step of triaxial brading of said carbon fibers includes the step of:

locating the individual strands in a $0/\pm 30°$-$40°$ orientation of by controlling the guide mechanism as the carbon fibers are placed on said mandrel.

5. The method as recited in claim 4 wherein said step of triaxially braiding said first, second and third layers of carbon fiber consists of;

layering at least two plys of fabric in each layer to provide sufficient axial and transverse strength to withstand the loads applied to the fixture from pressurized fluid in said bore.

6. The method as recited in claim 5 further includes the step of:

locating a fifth spacer on said third layer over said second and forth spacers; and triaxially braiding a fourth layer of carbon fibers over said third layer and said fifth spacer to further strengthen the second end of said resulting cylindrical body.

7. The product produced by the method as recited in claim 6.

* * * * *